May 17, 1938. G. W. WELLNER 2,117,832
ANCHOR BOLT
Filed March 4, 1937
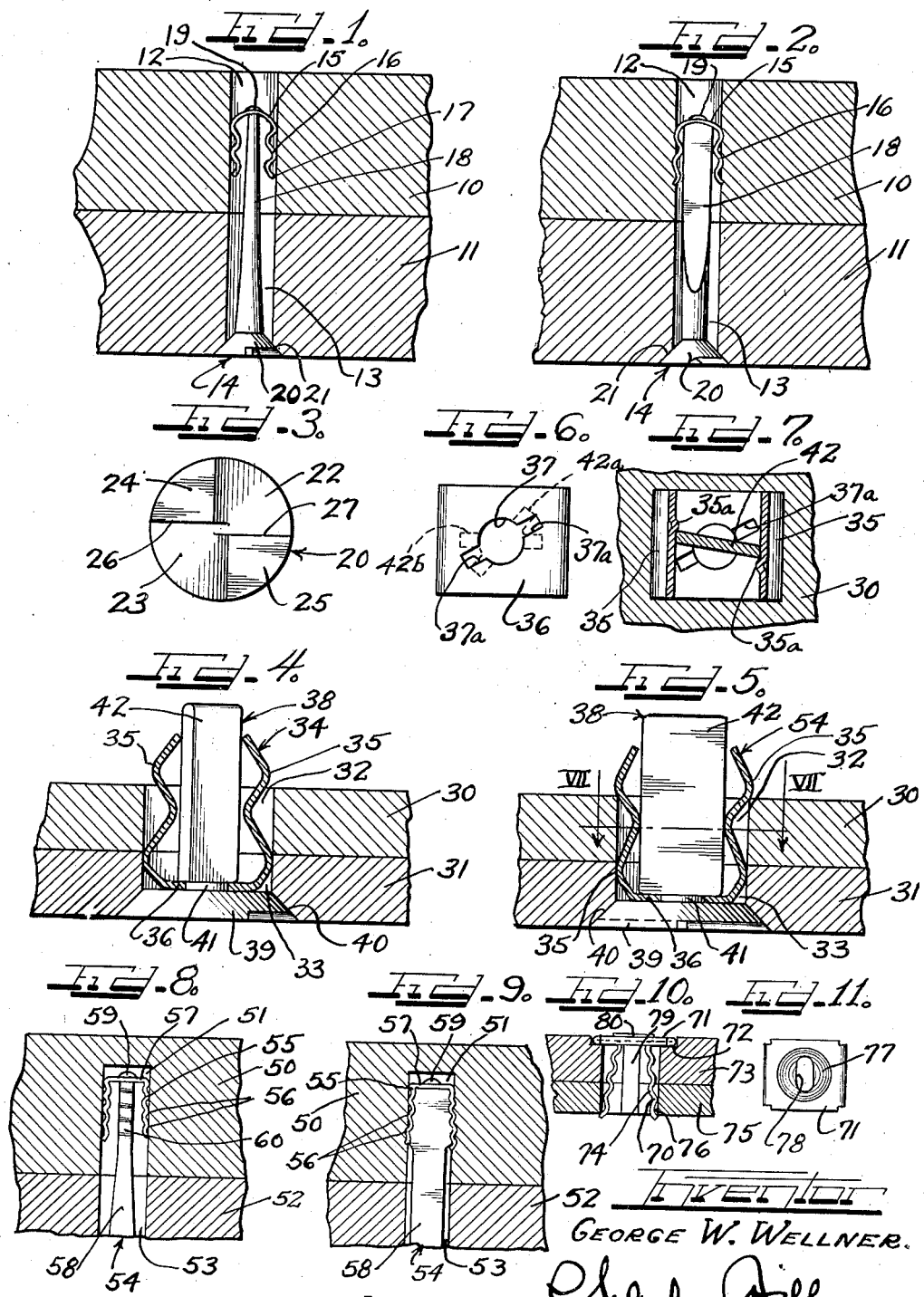
INVENTOR
GEORGE W. WELLNER Patented May 17, 1938

2,117,832

UNITED STATES PATENT OFFICE 2,117,832

ANCHOR BOLT

George W. Wellner, Des Plaines, Ill.

Application March 4, 1937, Serial No. 128,897

12 Claims. (Cl. 85—2.4)

This invention relates to anchor bolts adapted to be locked into position by a quarter turn of an expander forming part of the bolt construction.

More specifically this invention relates to fasteners for joining wood boards, metal plates, sheet rock, laths and the like materials or for securing hooks, door stops and the like to supporting structures, wherein a spring clip member is inserted in a hole in the boards, plates or supporting structure and a headed expander member, having the head thereof engaging the other board, or plate to be joined therewith, or the face of the supporting structure, extends through the spring clip member and, when rotated a quarter turn, expands the same into locking engagement with the material forming the hole in which it is placed.

According to this invention a spring clip member is formed with gripping sides such as corrugations and the like. In one form of the invention the spring clip may have the expander or bolt member integrally but rotatably connected therewith. In another form of the invention the spring clip member may be separate from the expander or bolt member while the latter is adapted to be locked into the spring clip when rotated to expand the clip.

It is then an object of this invention to provide fasteners or clips for joining materials together, which fasteners or clips are locked into gripping position by a quarter turn of an expander member forming part of the fastener or clip construction.

Another object of this invention is to provide inexpensive forms of anchor bolts adapted to be expanded in a hole by a quarter turn of an expander member forming part of the bolt construction.

A further object of this invention is to provide, in anchor bolt constructions, an expander member which is or becomes locked to the gripping member and serves to retain a sheet, board or plate against the material in which the expanding member is seated.

A further object of this invention is to provide an anchor bolt construction in which the expander member performs a dual function of expanding the bolt construction into gripping position and serving as a joining means.

Another object of this invention is to provide anchor bolt or fastener constructions in which an expander member is disposed in locking engagement with a spring clip member when operated to expand the latter.

Other and further objects of this invention will become apparent to those skilled in the art from the following detailed description of the annexed sheet of drawings which discloses preferred embodiments of the invention.

On the drawing:

Figure 1 is a side elevational view of one form of anchor bolt according to this invention seated in aligned holes of two pieces of abutting slab material shown in vertical cross section.

Figure 2 is a view similar to Figure 1, but showing the anchor bolt in expanded and locked position.

Figure 3 is a top plan view of a preferred form of head used on the expander member of the anchor bolts according to this invention.

Figure 4 is a side elevational view of another form of anchor bolt according to this invention seated in aligned holes of abutting pieces of slab material shown in vertical cross-section.

Figure 5 is a view similar to Figure 4 showing the anchor bolt in expanded and locked position in the holes.

Figure 6 is a top plan view of the spring clip member of the anchor bolt construction shown in Figures 4 and 5 and illustrating in dotted lines the locking of the expansion member therein.

Figure 7 is a cross-sectional view taken substantially along the line VII—VII of Figure 5.

Figure 8 is a broken side elevational view of another form of anchor bolt construction according to this invention seated in a blind bore of a piece of slab material shown in cross-section.

Figure 9 is a view similar to Figure 8 showing the anchor bolt of Figure 8 in locked expanded position.

Figure 10 is a side elevational view of another form of anchor bolt according to this invention seated in aligned holes of abutting slab pieces.

Figure 11 is a top plan view of the anchor bolt shown in Figure 10.

As shown on the drawing:

In Figures 1 and 2 the reference numerals 10 and 11 designate abutting pieces of slab material such as sheet rock, wooden boards, metal plates or the like having holes 12 and 13 in aligned relationship. The holes 12 and 13 are preferably of non-circular cross-section.

According to this invention the slabs 10 and 11 are rigidly and tightly secured together by an anchor bolt 14 seated in the holes 12 and 13. The anchor bolt 14 comprises a spring clip member 15 having diametrically opposed sides 16 provided with corrugated gripping outer surfaces. The sides 16 are preferably outturned at their edges 17 for a purpose to be hereinafter described.

The spring clip member 15 is U-shaped and is provided with a hole in the bottom thereof for receiving therethrough a lug formed on the end of an expansion member 18. The lug is peened over the spring clip 15 as at 19 so that the expander 18 is integrally but rotatably united with the spring clip 15.

The expander 18 has a shank portion non-circular in cross-section and as shown in Figure 1 is spaced from the sides 16 of the spring clip member 15 when its major axis is disposed parallel to the sides 16. However, when the expander 18 is rotated so that the major axis of its shank portion is at right angles to the sides 16 of the clip member 15 the edges of the shank portion force the sides 16 outwardly to dig into the walls of the hole 12 in the slab 10. This securely locks the spring clip 15 into the hole 12.

The expander 18 has a head 20 thereon engaging a countersunk portion 21 of the hole 13 in the slab 11 and the slabs 10 and 11 are thus locked together.

In assembling the slabs 10 and 11 together therefore by means of an anchor bolt according to this invention, non-circular holes 12 and 13 are provided therethrough and the slabs positioned so that the holes thereof are in alignment. The anchor bolt 14 is then inserted in non-expanded position such as shown in Figure 1 into the holes 12 and 13. A quarter turn of the expander 18 of the bolt construction forces the sides 16 of the U-shaped spring clip 15 into the walls of the holes 12 in the slab 10 and securely locks the clip in the hole. Since the expander is united to the spring clip by means of the peened lug 19 and is provided with a head 20 engaging the countersunk portion of the hole 13 in the slab 11, the two slabs are rigidly held together by a mere quarter turn of the expander 18.

As shown in Figure 3, the head 20 of the expander 18 is preferably formed with recessed quadrants 22 and 23 tapering downward from non-recessed quadrants 24 and 25 respectively to define shoulders 26 and 27. A gripping tool can be formed with knobs to fit in the recessed quadrants 22 and 23 and when the tool is rotated in a clockwise direction these knobs will abut the shoulders 26 and 27 to rotate the expander. However, a reverse rotation in a counter-clockwise direction will cause no movement of the expander but will merely serve to discharge the tool from engagement with the head 20 thereof because the recessed portions 22 and 23 taper upward to the head portions 24 and 25.

A tool can thus be devised to force the anchor bolt into the holes 12 and 13 as shown in Figure 1 while causing a quarter turn revolution in a clockwise direction of the expander 18 to lock the anchor bolt into position. The tapered portion of the recesses 22 and 23 makes possible a ready location of the gripping shoulders 26 and 27 on the head of the expander.

In the modification shown in Figures 4 to 7 the U-shaped spring clip member, instead of being disposed at the end of the shank on the expander member, is disposed at the head end of the expander member. In this modification, also, the expander and spring clip are not permanently associated as in the modification illustrated in Figures 1 and 2 but are separately disposed and become locked into permanent association when the spring clip is expanded into locking position.

In Figures 4 and 5, the reference numerals 30 and 31 illustrate pieces of slab material in abutting relation and have aligned non-circular holes 32 and 33 therethrough.

A U-shaped spring clip member 34 has corrugated diametrically opposed gripping sides 35 and a flat bottom portion 36 best shown in Figure 6. The bottom portion 36 of the spring clip 34 is provided with a key slot opening 37.

An expander member 38 (Figures 4 and 5) has an enlarged head 39 which may be formed as shown in Figure 3, seated in a countersunk portion 40 of the hole 33 in the slab 31. An annular neck portion 41 of the expander 38 is disposed through the key slot 37 on the flat face 36 of the spring clip 34 and a rectangular shank portion 42 of the expander is disposed between the sides 35 of the spring clip.

The shank 42 is adapted to be inserted through the key slot 37 along the major axis thereof provided by the ears 37a of the slot as shown in Figure 6. However, when the expander is rotated so that the shank 42 is offset from the ears 37a of the slot 37 as shown in dotted lines in Figure 6, the expander is locked into the spring clip member. The sides 35 of the clip are preferably close enough together in their normal position so that when the shank 42 is inserted through the slot and released, the sides of the clip will snap the shank into the position shown in dotted lines at 42a (Fig. 6). The clip and expander are thus locked together for shipping. A clockwise rotation of the expander to the position shown at 42b (Fig. 6) forces the sides 35 of the clip outwardly to force the corrugated gripping edges thereof into the material defining the holes 32 and 33 or, as also shown in Figure 5, to force some of the gripping edges over the mouth of the hole 32.

In order to prevent a jarring of the anchor bolt from rotating the shank 42 of the expander member away from the gripping edges 35 and thereby permitting the bolt to drop out of position the sides 35 of the spring clip may be provided with indented portions 35a as shown in Figure 7. Thus when the shank 42 of the expansion member is rotated from position 42a to position 42b to force the sides 35 outwardly, it cannot be rotated further without considerable effort because of the indents 35a. A counter-clockwise rotation of the shank 42 from position 42b will not occur without force because the sides 35 of the clip must be forced outwardly. In other words, the shank 42 is rotated beyond "dead center" and is held against further rotation by the indents 35a and against back rotation by the sides 35. A gripping tool engaging the head 39 of the expander, however, can rotate the same from its locked position 42b.

In the modification shown in Figures 8 and 9 a piece of slab material 50 is provided with a blind bore 51 therein. A second piece of slab material 52 having a hole 53 therein is disposed in abutting relation with the slab 50 so that the hole 53 is in alignment with the blind bore 51.

An anchor bolt 54 is disposed in the bore 51 and hole 53 of the slabs 50 and 52 and comprises a U-shaped spring clip member 55 having a plurality of concentric corrugated portions 56 along the sides thereof and a flat top portion 57 for receiving therethrough the lug end of an expander member 58. The end of the lug is peened over as at 59 to rotatably join the expander 58 with the spring clip 55.

The expander 58 is provided with a plurality of sloping cam edges 60 adapted to engage the corrugated sides 56 of the spring clip member 55 when disposed at right angles to the sides of the spring clip.

The expander member is preferably rectangular in shape at the cammed end thereof so that when it is disposed edgewise as shown in Figure 8 it is in spaced relation from the sides 56 of the spring clip. However, when the expander 58 is rotated a quarter turn as shown in Figure 9, the cammed edges 60 thereof engage the corrugated sides 56 to expand the same and at the same time draw the expander 58 further into the blind bore 51 thereby drawing up the slab 52 against the slab 50. The cammed edges of the expander and the corrugated sides of the spring clip are thus interlocked and the rotation of the expander not only forces the sides of the spring clip into the material forming the blind bore but also draws the expander further into the blind bore.

In the modifications illustrated in Figures 1 to 9 inclusive the U-shaped spring clip member is preferably inserted into a non-circular hole so that the same is not rotated with the expander member. However, gripping prongs or flanges can be formed on the sides of the clip and extending therefrom to dig into the hole material for arresting a rotation of the clip. The clips can then be used in circular holes and will not rotate with the expander.

The clips can be made round or oval shape if desired.

In the modification shown in Figures 10 and 11 it is not necessary to provide a non-circular hole through the material to be joined. In this modification a spring clip member 70 can be formed from one piece of metal as shown and provided with a rectangular or square head 71 for seating into a rectangular or square depression 72 in a piece of slab material 73. The spring clip member 70 has the usual corrugated sides 74 adapted to engage the material 75 through which a hole 76 for receiving the sides 74 is formed.

The top of the head 71 may be provided with a depressed central portion 77 defining an oval shaped hole 78. An expander member 79 similar to the expander 42 disclosed in Figures 4 and 5 is adapted to fit edgewise through the hole 78 and be rotated so that the edges of its rectangular shank force the sides 74 of the member 70 into locking engagement with the material defining the holes. The head 80 of the expander 79 can be seated in the depressed portion 77 on the head 71 of the spring clip member so as to be flush with the surface of the material 73.

In this modification, therefore, the spring clip member is not completely disposed in the hole of the materials receiving the same but has the head portion thereof locked against rotation in a recess such as 72 formed in the material. The expander can then be operated by rotation of the head 80 thereof which rests on the head 71 of the spring clip member.

In view of the above descriptions it should be understood that this invention contemplates the utilization of fasteners or clip members having gripping sides adapted to be forced into the walls of blind bores, holes, and the like, to be firmly embedded in these walls. Various forms of expanders are utilized to force the gripping edges of the clips into the material. The expander itself can be utilized as a joining means as in the modifications illustrated in Figures 1 to 9, or the clip member can be utilized as the joining means.

The anchor bolts of this invention are useful not only in joining materials together, but can also be used for inserting door stops, hangers, and the like protruding hardware.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. An anchor bolt comprising an expansible member having a gripping outer side wall and an end wall, a headed member having a shank extending into said expansible member in spaced relation from the inside of the gripping wall thereof in one position, said headed member being rotatable in said expansible member into contact with the inside of the gripping wall thereof for forcing the same outwardly and means cooperating with the end wall securing the members together.

2. Fastener construction comprising an expansible member having side walls joined by a connecting wall, an expander having a portion extending through the connecting wall and a shank portion disposed between the side walls in rotatable relation thereto, said shank portion being in spaced relation from the side walls in one position thereof, said expander being rotatable in the expansible member to bring the shank portion thereof adjacent the side walls of the expansible member for forcing the side walls outwardly.

3. An anchor bolt construction comprising a U-shaped clip, an expander extending into said clip in spaced relation from the side walls thereof in one position, said expander being rotatable in the clip into engagement with the side walls thereof to force the same outwardly and means securing the clip and expander together.

4. An anchor bolt comprising a clip member having side walls joined by a connecting wall, said side walls being provided with outer gripping surfaces, an expander having a portion extending through the connecting wall and a shank portion disposed between the side walls in rotatable relation thereto, said shank portion, in one position, being spaced from the side walls and being rotatable into engagement with the side walls for forcing the same outwardly and means securing the expander and clip together in rotatable relation.

5. An anchor bolt construction comprising a U-shaped spring clip having side walls provided with gripping outer surfaces, an expander having a head at one end, a shank extending from said head into said clip, and a lug end extending through the clip, said lug end being enlarged on the outside of the clip to hold the clip and expander together in rotatable relation, said shank portion of said expander being of greater width than the space between the side walls of the clip but being of lesser thickness than said space whereby a quarter turn of the head of the expander will spread the side walls of the clip outwardly into gripping engagement with material disposed therearound.

6. Anchor bolt construction comprising a clip member having side walls joined by a connecting wall, said connecting wall having a key slot opening therethrough, an expansion member adapted to be inserted through said key slot and rotated in said clip to be locked in the slot and force the side walls of the clip outwardly.

7. Anchor bolt construction comprising a clip having spaced side walls provided with gripping outer surfaces and a wall connecting said side walls, said connecting wall having a key slot opening therein, an expander member having an enlarged head portion, an intermediate portion adapted to rotate in the key slot of the clip and a shank portion of greater width than the minor axis of the slot but of less width than the major axis of the slot and of greater width than the space between the side walls whereby upon insertion of the expander into the clip the shank portion will be in spaced relation from the side walls thereof and a rotation of the head of the expander will bring the shank portion into engagement with the side walls of the clip to force the same outwardly into gripping engagement with material surrounding the clip.

8. Anchor bolt construction comprising a U-shaped spring clip having side walls provided with gripping edges and an elongated opening in the wall connecting the side walls, an expander having a shank portion of greater width than the space between the side walls of the clip and a thickness of less size than said space, said expander adapted to be inserted through said elongated opening and rotated relative to said clip into engagement with the side walls thereof for forcing the same outwardly into locking engagement with materials surrounding the clip and means on the inside of said clip arresting a further rotation of the clip.

9. A fastener construction comprising a metal clip having spaced opposed side walls provided with gripping outer edges and a wall connecting said side walls, an opening through said connecting wall, an expander having a lug end rotatable in said opening, said lug end being enlarged on the outside of the clip to hold the clip and expander together in rotatable relation, said expander having a shank portion disposed between the side walls of the clip provided with cammed edges for engagement with the inside of the gripping surfaces of said sides whereby a quarter turn rotation of the expander will bring the cammed surfaces of the shank portion thereof into engagement with the side walls of the clip for forcing the same outwardly.

10. An anchor bolt construction comprising a headed member having spaced opposed gripping fingers extending therefrom, an elongated opening in the head of said member, and an expander adapted to be inserted through said elongated opening and rotated into engagement with the fingers to force the same outwardly into gripping engagement with materials surrounding the fingers.

11. An anchor bolt construction comprising a U-shaped spring clip having gripping side walls, an expander having a shank portion disposed between said side walls, said shank portion having a major axis greater than the space between the side walls and a minor axis less than the space between said side walls, and a head on said expander having diametrically opposite recessed portions tapering downwardly from raised portions to provide shoulders for engagement with a rotating tool whereby a quarter turn rotation of the head will move the shank into engagement with the side walls of the clip for forcing the same outwardly.

12. An anchor bolt construction comprising a U-shaped spring clip adapted to be inserted into a non-circular hole, an expander having a major axis greater than the space between the side walls of the clip and a minor axis less than the space between the side walls of the clip, and a head on said expander adapted to seat against material to be joined by the anchor bolt whereby a quarter turn rotation of said head will bring the shank of the expander into contact with the side walls of the clip for forcing the same outwardly into engagement with the materials surrounding the hole.

GEORGE W. WELLNER.